United States Patent
Patel

(10) Patent No.: US 6,486,251 B1
(45) Date of Patent: Nov. 26, 2002

(54) SPECIAL VISUAL EFFECT POLYCARBONATE-POLYESTER COMPOSITION

(75) Inventor: Bimal Ramesh Patel, Evansville, IN (US)

(73) Assignee: General Electric Company, Pittsfield, MA (US)

( * ) Notice: Subject to any disclaimer, the term of this patent is extended or adjusted under 35 U.S.C. 154(b) by 0 days.

(21) Appl. No.: 09/515,467

(22) Filed: Feb. 29, 2000

(51) Int. Cl.⁷ .............................. C08K 3/08; C08K 3/34; C08L 51/00; C08L 67/00; C08L 69/00

(52) U.S. Cl. ..................... 524/439; 524/440; 524/441; 524/449; 524/504; 524/505; 524/513; 524/537

(58) Field of Search ................................ 524/439, 440, 524/441, 504, 505, 513, 537

(56) References Cited

U.S. PATENT DOCUMENTS

| | | |
|---|---|---|
| 2,465,319 A | 3/1949 | Whinfield et al. |
| 2,720,502 A | 10/1955 | Caldwell |
| 2,727,881 A | 12/1955 | Caldwell et al. |
| 2,822,348 A | 2/1958 | Haslam |
| 2,999,835 A | 9/1961 | Goldberg |
| 3,038,365 A | 6/1962 | Peterson |
| 3,047,539 A | 7/1962 | Pengilly |
| 3,153,008 A | 10/1964 | Fox |
| 3,334,154 A | 8/1967 | Kim |
| 3,635,895 A | 1/1972 | Kramer |
| 3,671,487 A | 6/1972 | Abolins |
| 3,864,428 A | 2/1975 | Nakamura et al. |
| 3,953,394 A | 4/1976 | Fox et al. |
| 3,953,539 A | 4/1976 | Kawase et al. |
| 4,001,184 A | 1/1977 | Scott |
| 4,123,436 A | 10/1978 | Holub et al. |
| 4,128,526 A | 12/1978 | Borman |
| 4,131,575 A | 12/1978 | Adelmann et al. |
| 4,198,200 A | * 4/1980 | Fonda et al. |
| 4,204,047 A | 5/1980 | Margotte et al. |
| 4,264,487 A | 4/1981 | Fromuth et al. |
| 4,401,804 A | 8/1983 | Wooten et al. |
| 4,904,729 A | * 2/1990 | Laughner |
| 5,091,010 A | 2/1992 | Souma et al. |
| 5,308,894 A | * 5/1994 | Laughner |
| 5,441,997 A | 8/1995 | Walsh et al. |
| 5,510,398 A | 4/1996 | Clark et al. |
| 5,814,712 A | 9/1998 | Gallucci et al. |
| 5,939,519 A | 8/1999 | Brunelle |
| 5,986,040 A | 11/1999 | Patel et al. |
| 6,162,511 A | * 12/2000 | Garnett et al. |

FOREIGN PATENT DOCUMENTS

| | | |
|---|---|---|
| EP | 0 426 446 A2 | 5/1991 |
| WO | WO 99/02594 | 1/1999 |

* cited by examiner

Primary Examiner—Tae H. Yoon

(57) ABSTRACT

A polycarbonate/polyester resin formulation has enhanced impact resistance and comprises a polycarbonate resin, a polyester resin, flakes having a desired coloration, and a modifier selected to enhance the impact strength of the molded resin.

44 Claims, No Drawings

1

SPECIAL VISUAL EFFECT POLYCARBONATE-POLYESTER COMPOSITION

FIELD OF THE INVENTION

This invention relates to a modified polycarbonate-polyester composition containing special-effect colorants and articles molded from such resin compositions.

BACKGROUND OF THE INVENTION

Polyester resins derived from terephthalic acid and reactive derivatives thereof, such as dimethyl terephthalate, and alkanediols have been known for some time and have become important constituents for moldable compositions. Workpieces molded from such polyester resin compositions, alone, or combined with reinforcements, offer a high degree of surface hardness and abrasion resistance, chemical resistance, and high gloss. Polyester resins are blended with other carefully selected resins to improve impact strength, as well as tensile strength, modulus and distortion temperature. For example, polyesters are blended with aromatic polycarbonates as set forth in Kawase et al, U.S. Pat. No. 3,953,539.

Impact modified polycarbonate/polyester resins are excellent materials for applications requiring high impact, chemical resistance, and appealing aesthetic. In order to improve the appearance, special effect additives have been utilized as colorants. U.S. Pat. No. 5,510,398 to Clark et al relates to a highly filled, extruded polyalkylene terephthalate resin, a polycarbonate resin, a filler, a stabilizer, and a non-dispersing pigment to give the extruded thermoplastic material a speckled surface appearance. Column 5, lines 35 to column 6, line 61, describes impact modifiers. U.S. Pat. No. 5,441,997 to Walsh et al describes the use of impact modifiers in conjunction with polycarbonate/polyester compositions having a barium sulfate, strontium sulfate, zirconium oxide, or zinc sulfate filler. U.S. Pat. No. 5,814,712 to Gallucci et al describes a glycidyl ester as an impact modifier, and optionally other impact modifiers, for a polycarbonate/polyester resin. U.S. Pat. No. 4,264,487 to Fromuth et al describes aromatic polycarbonate, acrylate-based core-shell polymer, and aromatic polyester.

The following patents relate to metallic type pigments. WO 99/02594 which describes the use of rectangular aluminum flakes in Nylon compositions. U.S. Pat. No. 5,091,010 and EP 0 426 446 relate to the aesthetics of molded articles containing flakes. These references do not address mechanical performance concerns which are addressed by the present invention.

Among the problems to be solved when utilizing polycarbonate/polyester resins and particles and pigments to produce special color effects are those related to composition coloring and those related to producing a very bright, metallic reflective sparkle appearance in the molded articles while retaining impact strength. The use of special visual effect colorants in combination with unpreferred impact modifiers may to be detrimental to physical properties such as notched Izod impact. Although various impact modifiers are known in the prior art, the prior art is deficient in addressing the problem of enhancing the impact properties of polycarbonate/polyester resins having special effect colorants.

SUMMARY OF THE INVENTION

A polycarbonate/polyester resin formulation which has enhanced impact resistance comprises flakes having a coloration and/or metallic gloss, and a modifier selected to enhance the impact strength of the molded resin.

In a process for preparing the polycarbonate/polyester resin molding formulation, a desirable flake which is robust under compounding and molding conditions, has desirable color and aesthetics, and is compatible with blend components is selected. A compatible impact modifier is selected for enhancing the impact properties of the molded resin It is desirable that the flakes display a bright, reflective sparkle or reflective metallic gloss appearance rather than appearing dull. It is further desirable that the look and consistency of the finished product can be controlled.

In a preferred embodiment of the present invention, a molding composition and molded articles which, based on the total weight of the composition, consist essentially of (a) from 10 to 90 weight percent of a polyester resin; (c) from 90 to 10 weight percent of an aromatic polycarbonate resin; (d) an effective amount of a modifier selected to enhance the impact strength of a molded resin, preferably a core-shell modifier having a butadiene-based copolymer rubber substrate with a methacrylate containing graft or an ABA triblock modifier with A polymeric units from styrene or derivatives thereof and B polymeric units from butadiene or derivatives thereof, and (e) a sufficient amount of a flakes for imparting a desired special visual effect, where the impact modifier enhances the impact strength of a molded composition as compared to a molding composition absent the modifier with the notched Izod impact strength preferably being at least about 6 ft.lbs./in., and more preferably at least 9 ft.lbs./in., according to ASTM test D256.

The most preferred molding compositions are MBS modified compositions with low temperature and room temperature impact strength.

According to another embodiment an effective amount of a random, block, and graft copolymers of vinyl aromatic compounds and conjugated dienes may be utilized to enhance the impact strength at higher temperatures.

The blend compositions combine appealing aesthetics, chemical resistance, and high impact properties and will be useful in molded article applications where this combination of properties is desirable.

Thermoplastic polymer blends containing flakes, such as metal or mica, typically drop significantly in notched Izod impact properties if they are not properly impact-modified. Not all impact modifiers are effective for retaining impact properties upon addition of metallic or pearlescent pigments. For example, the notched Izod values of EMA-GMA modified polycarbonate/poly(butylene terephthalate) (PC/PBT) blends can drop from 16 ft.lbs./in. to 2 ft.lbs./in. upon addition of as little as 0.8 weight percent metal flakes. According to the preferred embodiments of the present invention, methacrylate-butadiene-styrene (MBS) modified PC/PBT blends retain average notched Izod values above 6 ft.lbs./in., and more typically above 9 ft.lbs./in., at room temperature in the presence of metal flakes. The EMA-GMA glycidic impact modifiers are described in U.S. Pat. No. 5,814,712 to Gallucci et al.

DESCRIPTION OF THE PREFERRED EMBODIMENTS

The polyester resin component comprises structural units of the following formula:

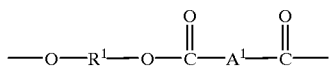

wherein each $R^1$ is independently a divalent aliphatic, alicyclic or aromatic hydrocarbon or polyoxyalkylene radical, or mixtures thereof and each $A^1$ is independently a divalent aliphatic, alicyclic or aromatic radical, or mixtures thereof. Examples of suitable polyesters containing the structure of the above formula are poly(alkylene dicarboxylates), liquid crystalline polyesters, and polyester copolymers. It is also possible to use a branched polyester in which a branching agent, for example, a glycol having three or more hydroxyl groups or a trifunctional or multifunctional carboxylic acid has been incorporated. Furthermore, it is sometimes desirable to have various concentrations of acid and hydroxyl end groups on the polyester, depending on the ultimate end-use of the composition.

The $R^1$ radical may be, for example, a $C_{2-10}$ alkylene radical, a $C_{6-12}$ alicyclic radical, a $C_{6-20}$ aromatic radical or a polyoxyalkylene radical in which the alkylene groups contain about 2–6 and most often 2 or 4 carbon atoms. The $A^1$ radical in the above formula is most often p- or m-phenylene, a cycloaliphatic or a mixture thereof. This class of polyester includes the poly(alkylene terephthalates) and the polyarylates. Such polyesters are known as illustrated by the following patents:

U.S. Pat. Nos. 2,465,319 2,720,502 2,727,881 2,822,348 3,047,539 3,671,487 3,953,394 4,128,526

Examples of aromatic dicarboxylic acids represented by the dicarboxylated residue A1 are isophthalic or terephthalic acid, 1,2-di(p-carboxyphenyl)ethane, 4,4'-dicarboxydiphenyl ether, 4,4' bisbenzoic acid and mixtures thereof. Acids containing fused rings can also be present, such as in 1,4- 1,5- or 2,6- naphthalenedicarboxylic acids. The preferred dicarboxylic acids are terephthalic acid, isophthalic acid, naphthalene dicarboxylic acid, cyclohexane dicarboxylic acid or mixtures thereof.

The most preferred polyesters are poly(ethylene terephthalate) ("PET"), and poly(1,4-butylene terephthalate), ("PBT"), poly(ethylene naphthanoate) ("PEN"), poly(butylene naphthanoate), ("PBN") and (polypropylene terephthalate) ("PPT"), and mixtures thereof. Other preferred polyesters include cycloaliphatic polyesters such as poly(1,4-cyclohexylenedimethylene 1,4-cyclohexanedicarboxylate) ("PCCD"), made from 1,4-cyclohexandimethanol, dimethyl 1,4-cyclohexanedicarboxylate, and/or derivatives thereof (see U.S. Pat. Nos. 5,986,040 and 5,939,519) which has recurring units of the formula:

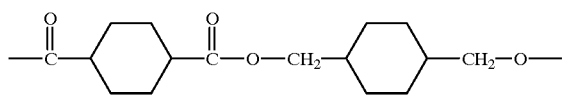

Also contemplated herein are the above polyesters with minor amounts, e.g., from about 0.5 to about 5 percent by weight, of units derived from aliphatic acid and/or aliphatic polyols to form copolyesters. The aliphatic polyols include glycols, such as poly(ethylene glycol) or poly(butylene glycol). Such polyesters can be made following the teachings of, for example, U.S. Pat. Nos. 2,465,319 and 3,047,539.

The preferred poly(1,4-butylene terephthalate) resin used in this invention is one obtained by polymerizing a glycol component at least 70 mol %, preferably at least 80 mol %, of which consists of tetramethylene glycol and an acid or ester component at least 70 mol %, preferably at least 80 mol %, of which consists of terephthalic acid, and polyester-forming derivatives therefore.

The polyesters used herein have an intrinsic viscosity of from about 0.4 to about 2.0 dl/g as measured in a 60:40 phenol/tetrachloroethane mixture or similar solvent at 23°–30° C. Preferably the intrinsic viscosity is 1.1 to 1.4 dl/g. VALOX Registered TM 315 polyester is suitable for this invention.

The polyester resin component is blended with a polycarbonate resin. Polycarbonate resins useful in preparing the blends of the present invention are generally aromatic polycarbonate resins. Typically these are prepared by reacting a dihydric phenol with a carbonate precursor, such as phosgene, a haloformate or a carbonate ester. Generally speaking, such carbonate polymers may be typified as possessing recurring structural units of the formula

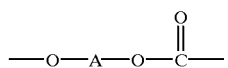

wherein A is a divalent aromatic radical of the dihydric phenol employed in the polymer producing reaction. Preferably, the carbonate polymers used to provide the resinous mixtures of the invention have an intrinsic viscosity (as measured in methylene chloride at 25° C.) ranging from about 0.30 to about 1.00 dl/g. The dihydric phenol which may be employed to provide such aromatic carbonate polymers are mononuclear or polynuclear aromatic compounds, containing as functional groups two hydroxy radicals, each of which is attached directly to a carbon atom of an aromatic nucleus. Typical dihydric phenols are: 2,2-bis(4-hydroxyphenyl)propane; hydroquinone; resorcinol; 2,2-bis(4-hydroxyphenyl)pentane; 2,4'-(dihydroxydiphenyl) methane; bis(2 hydroxyphenyl)methane; bis(4-hydroxyphenyl) methane; 1,1-bis(4-hydroxyphenyl)-3,3,5-trimethylcyclohexane; fluorenone bisphenol, 1,1-bis(4-hydroxyphenyl) ethane; 3,3-bis(4-hydroxyphenyl) pentane; 2,2-dihydroxydiphenyl; 2,6-dihydroxynaphthalene; bis(4-hydroxydiphenyl)sulfone; bis(3,5-diethyl4-hydroxyphenyl) sulfone; 2,2-bis(3,5-dimethyl-4-hydroxyphenyl)propane; 2,4'-dihydroxydiphenyl sulfone, 5'-chloro-2,4'-dihydroxydiphenyl sulfone; bis-(4-hydroxyphenyl)diphenyl sulfone; 4,4'-dihydroxydiphenyl ether; 4,4'-dihydroxy-3,3'-dichlorodiphenyl ether; 4,4-dihydroxy-2,5-dihydroxydiphenyl ether; and the like.

Other dihydric phenols which are also suitable for use in the preparation of the above polycarbonates are disclosed in U.S. Pat Nos. 2,999,835; 3,038,365; 3,334,154; and 4,131,575.

These aromatic polycarbonates can be manufactured by known processes, such as, for example and as mentioned above, by reacting a dihydric phenol with a carbonate precursor, such as phosgene, in accordance with methods set forth in the above-cited literature and in U.S. Pat. No. 4,123,436, or by transesterification processes such as are disclosed in U.S. Pat. No. 3,153,008, as well as other processes known to those skilled in the art.

It is also possible to employ two or more different dihydric phenols or a copolymer of a dihydric phenol with a glycol or with a hydroxy- or acid-terminated polyester or with a dibasic acid in the event a carbonate copolymer or interpolymer rather than a homopolymer is desired for use in the preparation of the polycarbonate mixtures of the invention. Branched polycarbonates are also useful, such as are described in U.S. Pat. No. 4,001,184. Also, there can be utilized blends of linear polycarbonate and a branched polycarbonate. Moreover, blends of any of the above materials may be employed in the practice of this invention to provide the aromatic polycarbonate.

One aromatic carbonate for use in the practice in the present invention is a homopolymer, e.g., a homopolymer derived from 2,2-bis(4-hydroxyphenyl)propane (bisphenol-A) and phosgene, commercially available under the trade designation LEXAN Registered TM from General Electric Company.

Branched polycarbonates may be utilized and are prepared by adding a branching agent during polymerization. These branching agents are well known and may comprise polyfunctional organic compounds containing at least three functional groups which may be hydroxyl, carboxyl, carboxylic anhydride, haloformyl and mixtures thereof. Specific examples include trimellitic acid, trimellitic anhydride, trimellitic trichloride, tris-p-hydroxy phenyl ethane, isatin-bis-phenol,tris-phenol TC (1,3,5-tris((p-hydroxyphenyl)isopropyl)benzene),tris-phenol PA (4(4(1,1-bis(p-hydroxyphenyl)-ethyl)alpha, alpha-dimethyl benzyl) phenol),4-chloroformyl phthalic anhydride, trimesic acid and benzophenone tetracarboxylic acid. The branching agent may be added at a level of about 0.05–2.0 weight percent. Branching agents and procedures for making branched polycarbonates are described in U.S. Pat. Nos. 3,635,895; 4,001,184; and 4,204,047 which are incorporated by reference.

All types of polycarbonate end groups are contemplated as being within the scope of the present invention.

Preferably the thermoplastic resin composition comprises an aromatic polycarbonate resin present at a level of from 10 to 90 percent by weight based on the total weight of the material, and a polyester resin present at a level of from 10 to 90 percent by weight based on the total weight of the thermoplastic resin composition, and more preferably the aromatic polycarbonate resin is present at a level of from 15 to 80 percent by weight based on the total weight of the composition, and most preferably present at a level of from 20 to 70 percent by weight based on the total weight of the composition. Preferably the polyester resin is present at a level of from 15 to 80 percent by weight based on the total weight of the thermoplastic resin composition, and more preferably is present at a level of from 20 to 70 percent by weight based on the total weight of the composition.

As indicated above, polyesters are typically prepared using metal catalysts which remain in the polyester product. Catalyst may include organic or inorganic compounds of cobalt, tin, antimony, zinc, titanium, magnesium, calcium, manganese, gallium, germanium, sodium, lithium, and the like. Titanium compounds, such as tetraalkyl titanates, are frequently used. The preparation of polyesters employing these metallic catalysts are described, for example, in U.S. Pat. No. 4,401,804 which is incorporated herein by reference. The residues of metal catalysts may cause transesterification between the polyester and polycarbonate.

A catalyst quencher may be used to deactivate metal catalyst residues. For instance, quenchers such as phosphorus acid, phosphoric acid and phosphites or phosphonites have been included in compositions comprising polyester and/or polycarbonate in order to improve the thermal stability of the composition. Compositions quenched with these additives may have unacceptable hydrolytic stability. When polyesters having epoxy functionality are included in a blend with polycarbonate, preferred catalyst quenchers are suitable metal phosphates, metal acid phosphates, metal acid pyrophosphates and metal polyphosphates for enhancing hydrolytic stability of the resulting molded article.

Suitable quenchers include metal acid phosphates, metal acid pyrophosphates and metal pyrophosphates, each being embraced by the general formula

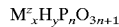

$$M^z_x H_y P_n O_{3n+1}$$

wherein M is a metal, "x" is a number ranging from 1 to 12, and "y" is a number ranging from 1 to 12, "n" is a number in the range of 1 to 10, "z" is a number in the range of 1 to 5, and the sum of xz+y is equal to n+2.

The metal acid pyrophosphates of this invention preferably comprise metals from Group 1A of the Periodic Table of Elements, particularly, sodium and potassium. Suitable pyrophosphates embraced by the formula above include $Na_3HP_2O_7$, $K_2H_2P_2O_7$, $KNaH_2P_2O_7$, $MgH_2P_2O_7$ and $NaH_2PO_4$. The preferred metal acid pyrophosphate for use in the compositions of this invention is sodium dihydrogen pyrophosphate, i.e., $Na_2H_2P_2O_7$.

The catalyst quencher preferably is present in the composition in the range of about 0.005 parts to about 5.0 parts by weight of the polyester component and most preferably from about 0.1 parts to about 2.0 parts.

The above-mentioned acid phosphates and pyrophosphates may be mixed with the polymers by any suitable means. Since most phosphates are solids, they can be most expeditiously mixed with the resin either as a precompounded concentrate or directly into the melt, e.g., in an extruder.

The metal acid phosphates and pyrophosphates preferably will have particle diameters of less than 75 microns, more preferably less than 50 microns, and most preferably less than 20 microns. If the particles have a diameter equal to or greater than 75 microns, the compositions containing the metal acid pyrophosphates may have reduced impact strength.

Additional quenchers suitable for this invention include Group IB and Group IIB metal phosphate salts such as calcium phosphate and zinc phosphate.

Hydrates and mixtures of the above salts also are suitable as quenchers for the composition of this invention. Reference to any of the above salts, thus, also are meant to refer to the hydrates and/or mixtures containing those salts. Preferred hydrates include dihydrates and tetrahydrates.

Preferred catalyst quenchers are monosodium phosphate, monopotassium phosphate, zinc acid phosphate and calcium acid phosphate.

As an additional resin component, an effective amount of an impact modifier is used for enhancing the impact strength of the polyester blends in the presence of special effect additives.

Preferred impact modifiers have polymer units of a low glass transition rubbery component in combination with polymeric units derived from vinyl aromatic compounds, acrylate compounds, alkylacrylate compounds or derivatives. Preferably the amount of impact modifier utilized is from about 5 to about 20 percent by weight based on the total weight of the resin molding composition.

To maintain ductility of a molded resin at temperatures on the order of minus ten degrees Centigrade, the preferred impact modifiers are core-shell type impact modifiers having a rubbery core comprising a polymer derived from butadiene or n-butyl acrylate and a shell comprising a polymer derived from a vinylaromatic compound, a vinylcyanide compound, or an alkyl methacrylate compound; preferably the shell is derived from methacrylate alone or in combination with styrene. Especially preferred grafted polymers are the core-shell polymers of the type available from Rohm & Haas, for example Paraloid EXL3691. Also present in the first stage are cross linking monomers and graft linking monomers. Examples of the cross linking monomers include 1,3-butylene diacrylate, divinyl benzene and butylene dimethacrylate. Examples of graft linking monomers are allyl acrylate, allyl methacrylate and diallyl maleate.

Core-shell copolymers, method of making core-shell copolymers and the use of core-shell copolymers as impact modifiers in combination with polycarbonate are described in U.S. Pat. Nos. 3,864,428 and 4,264,487.

Suitable core-shell copolymers are those that include a rubbery core that has a glass transition temperature ("Tg") below about minus 30° C., preferable below minus 40° C., and that comprises repeating units derived from one or more monoethylenically unsaturated monomers such as acrylate monomers, e.g. butyl acrylate, and conjugated diene monomers, e.g., butadiene and a rigid "shell" that has a Tg of greater than or equal to about 40° C. and that comprise repeating units derived from a monoethylenically unsatuated monomer, e.g., methyl methacrylate.

Another, preferred impact modifier which contains units derived from butadiene in combination with a vinyl aromatic compound comprises ABA triblock copolymers, especially those comprising styrene based blocks and butadiene or isoprene based blocks. As compared to the previously discussed core-shell impact modifiers, the block copolymer impact modifiers lack low temperature ductility properties. The conjugated diene blocks may be partially or entirely hydrogenated, whereupon they may be represented as ethylene-propylene blocks or the like and have properties similar to those of olefin block copolymers. Examples of triblock copolymers of this type are polystyrene-polybutadiene-polystyrene (SBS), hydrogenated polystyrene-polybutadiene-polystyrene (SEBS), polystyrene-polyisoprene-polystyrene (SIS), poly(α-methylstyrene)-polybutadiene-poly(α-methylstyrene) and poly(α-methylstyrene)-polyisoprene-poly(a-methylstyrene).

Particularly preferred triblock copolymers are available commercially as Kraton D®, and KRATON G® from Shell. KRATON Polymers and compounds with an unsaturated rubber midblock constitute the KRATON D series (styrene-butadiene-styrene, SBS and styrene-isoprene-styrene, SIS) while those with a saturated midblock make up the KRATON G series (styrene-ethylene/butylene-styrene, SEBS and styrene-ethylene/propylene-styrene, SEPS). Both D- and G-series polymers are elastic and flexible. The KRATON G-series polymers are preferred for weather resistance due to increased oxidation resistance.

The molding composition includes flakes for imparting a desired visual effect, where, together with the impact modifier, the impact strength of the molded composition as compared to a molding composition absent the impact modifier has enhanced impact resistance. The flakes which ranging in size between about 17.5 and about 650, preferably from about 30 to about 300 microns are used in loading of 0.3 to 7 weight percent, with about 0.5 to about 5.0 weight percent being preferred. The flakes are preferably mineral or metal flakes. The preferred mineral flakes are mica flakes. The term flakes is intended to include thin particles including thin film, foil, or platelets which typically have a reflective and/or metallic appearance. Preferred metals are based on metals of Group I-B, III-A, IV, VI-B and VIII of the periodic table. Examples of these metals include aluminum, bronze, brass, chromium, copper, gold, iron, molybdenum, nickel, tin, titanium, zinc and the like. A "cornflake" type or corrugated irregularly shaped planar flake of aluminum or bronze is may be utilized, although a "silver dollar" type or a circular planar type of flake may also be utilized.

Aluminum flakes produce a satiny silver luster. In general, smaller particle sizes tend to have greater opacity and hiding power with a grayish effect, while larger flake sizes show greater brightness and reflectivity with increased metallic sparkle. Based on the size, concentration, and method of processing, various special visual effects may be obtained such as a pearlescent, metallic sparkle, metallic luster, or angular metamerism effect Glitter is a special type of aluminum pigment produced from foil. The foil, rolled to gauges of less than 0.001 inch, is cut into square, rectangular or hexagonal shapes in sizes from 0.008 to 0.125 inch and typically coated with a transparent epoxy lacquer to halt oxidative dulling of the foil. Glitter, with its large particle sizes, can produce discrete highlights of metallic sparkle.

Gold bronzes are actually brasses--alloys of copper and zinc with a small amount of aluminum to reduce oxidation. The range of gold colors is produced by varying proportions of major alloy components. The green gold contain 70 percent copper, and color becomes redder as the percentage of copper is increased; 90 percent copper produces pale gold; deep gold is made by controlled oxidation of the alloys. Gold bronzes are usually utilized in flake form, with coarser grades giving more brilliance. Copper must be utilized with care, however, as it is susceptible to heat, moisture and corrosives.

Lubricants such as ethylene bis stearamide, butyl stearate, glycerin or mineral oils or the like are sometimes included in the binder formulation, and may or may not be compatible with other blend components.

Other additional ingredients may include antioxidants, and UV absorbers, and other stabilizers. Antioxidants include i) alkylated monophenols, for example: 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl4-methylphenol, 2-(alpha-methylcyclohexyl)-4,6dimethylphenol, 2,6-di-octadecyl-4-methylphenol, 2,4,6,-tricyclohexyphenol, 2,6-di-tert-butyl-4-methoxymethylphenol; ii) alkylated hydroquinones, for example, 2,6-di-tert-butyl-4-methoxyphenol, 2,5-di-tert-butyl-hydroquinone, 2,5-di-tert-amylhydroquinone, 2,6-diphenyl octadecyloxyphenol; iii) hydroxylated thiodiphenyl ethers; iv) alkylidene-bisphenols; v) benzyl compounds, for example, 1,3,5-tris-(3,5-di-tert-butyl-4-hydroxybenzyl)-2,4,6-trimethylbenzene;

vi) acylaminophenols, for example, 4-hydroxy-lauric acid anilide; vii) esters of beta-(3,5-di-tert-butyl-4-hydroxyphenol)-propionic acid with monohydric or polyhydric alcohols; viii) esters of beta-(5-tert-butyl-4-hydroxy-3-methylphenyl)-propionic acid with monohydric or polyhydric alcohols; vii) esters of beta-(5-tert-butyl-4-hydroxy-3-methylphenyl) propionic acid with mono-or polyhydric alcohols, e.g., with methanol, diethylene glycol, octadecanol, triethylene glycol, 1,6-hexanediol, pentaerythritol, neopentyl glycol, tris(hydroxyethyl) isocyanurate, thiodiethylene glycol, N,N-bis(hydroxyethyl) oxalic acid diamide. Typical, UV absorbers and light stabilizers include i) 2-(2'-hydroxyphenyl)benzotriazoles ii) 2-Hydroxybenzophenones, and 2'-hydroxy4,4'-dimethoxy derivative, and iii) esters of substituted and unsubstituted benzoic acids for example, phenyl salicylate, 4-tertbutylphenyl-salicylate, octylphenyl salicylate, dibenzoylresorcinol, bis-(4-tert-butylbenzoyl)-resorcinol, benzoylresorcinol, 2,4-di-tert-butyl-phenyl-3,5-di-tert-butyl-4-hydroxybenzoate and hexadecyl-3,5-di-tert-butyl-4-hydroxybenzoate. Phosphites and phosphonites stabilizers, for example, include triphenyl phosphite, diphenylalkyl phosphites, phenyldialkyl phosphites, tris(nonyl-phenyl) phosphite, trilauryl phosphite, trioctadecyl phosphite, distearyl pentaerythritol diphosphite, tris(2,4-di-tert-butylphenyl)phosphite, diisodecyl pentaerythritol diphosphite, bis(2,4-di-tert-butylphenyl)pentaerythritol diphosphite tristearyl sorbitol triphosphite, and tetrakis(2,4-di-tert-butylphenyl)4,4'-biphenylene diphosphonite.

Dyes or pigments may be used to give a background coloration. Dyes are typically organic materials that are soluble in the resin matrix while pigments may be organic or inorganic compounds or complexes which are typically insoluble in the resin matrix. These organic dyes and pigments include the following classes and examples: furnace carbon black, titanium oxide, phthalocyanine blues or greens, anthraquinone dyes, scarlet 3b Lake, azo compounds and acid azo pigments, quinacridones, chromophthalocyanine pyrrols, halogenated phthalocyanines, quinolines, heterocyclic dyes, perinone dyes, anthracenedione dyes, thioxanthene dyes, parazolone dyes, polymethine pigments and others.

The flakes are incorporated into the resin composition by uniformly mixing into the desired resin composition. It is important that the flakes be stable at processing temperatures. Stability is desired at temperatures on the order of about 400, preferably at 500, and even more preferably 550 degrees F. Unstable flakes should be avoided.

The compositions of the present invention includes dyes and stabilizers which are added in effective amounts to impart the desired properties on the compositions of the present invention for the specific application.

The resin comprises less than 5 percent by weight additional ingredients which include the previously mentioned light stabilizers which added ingredients contribute to desirable properties previously mentioned and additional, important properties of good mechanical properties, color stability, oxidation resistance, good flame retardancy, good processability, i.e. short molding cycle times, good flow, and good insulation properties.

The method of blending the compositions can be carried out by conventional techniques. One convenient method comprises blending the resins and other ingredients in powder or granular form, extruding the blend and comminuting into pellets or other suitable shapes. The ingredients are combined in any usual manner, e.g., by dry mixing or by mixing in the melted state in an extruder, on a heated mill or in other mixers. An alternative method of blending can comprise preparing a preblend of the polyesters and then adding the other ingredients to the preblend. For example, a preblend of the resins and stabilizer can be fed into the upstream port of an extruder with addition of the other ingredients such as glass fibers in a downstream port of the extruder. In another embodiment, the various compounds can be precompounded, pelletized and then molded. Precompounding can be carried out in conventional equipment. For example, a dry blend of the ingredients can be fed into a single screw extruder, the screw having a long transition section to insure proper melting. Alternatively, a twin screw extrusion machine can be fed with the resins and other additives at the feed port and reinforcements fed downstream. In either case, a generally suitable machine temperature will be from about 450° F. of about 575° F. The precompounded composition can be extruded and cut or chopped into molding compounds, such as conventional granules, pellets, etc. by standard techniques. The compositions can be molded in any equipment conventionally used for thermoplastic compositions. For example, good results will be obtained in an injection molding machine, with conventional cylinder temperatures, e.g., 500° F., and conventional mold temperatures, e.g., 150° F.

To enhance the weatherability of a molded article, a clear coat may be used to cover outer surfaces that are exposed to weathering. The desirable coating is clear or substantially transparent so that the luster and the special visual effect of the molded article is remains visible. The coating may be a mono or multi-layered coating. Base coatings applied directly adjacent the substrate may be act as a primer coat to enhance the adhesion of an outer layer. Clear coats are commercially available from Red Spot™ coatings and may comprise a polyester, polyurethane, or acrylic type coating where an isocyanate reactive material reacts with an alcohol functionality to produce a desired coating. Commercially available coatings from Red Spot™ coatings include the 281 SL Series and the 206 LE Series.

EXAMPLES NOT OF THE INVENTION FOR COMPARISON PURPOSES

Examples A to G are not of the invention. Example A which contains EMA-GMA impact modifier without flakes has a high notched Izod impact. Note that in Examples B and C, the addition of flakes drastically lowers the notched Izod. Similarly, notice the high notched Izod of Example D without the flakes and the low Izod with the combination of flakes and the low Izod with the combination of flakes and modifier. Similarly, Examples K and L show that the notched Izod impact is significantly reduced in the presence of a Hytrel®-type impact modifier.

EXAMPLES OF THE INVENTION

If the proper impact modifier is used with the flakes, such as MBS core-shell impact modifier, a significant portion of notched Izod impact is retained, as shown in the table below. Note in particular examples 1–5 where metal flake containing MBS modified PC/PBT blends have average room temperature notched Izod values above 9 ft.lbs/in. With the use of a preferred impact modifier, the notched Izod is preferably greater than about 9 ft.lbs./in.

|  | Example | | |
|---|---|---|---|
|  | A | B | C |
| Lexan ML4505-111 | 18.91 | 18.20 | 18.34 |
| Lexan ML8199-111N | 39.89 | 38.40 | 38.69 |
| PBT 315 | 29.72 | 28.61 | 28.83 |
| 80:20 PC:Lotader AX8900 EMA-GMA conc. | 10.31 | 9.92 | 10.00 |
| Stabilizer Package | 1.18 | 1.12 | 1.14 |
| 760-20-E. 54 µm Al pigment |  | 3.75 |  |
| 880-20-E. 34 µm Al pigment |  |  | 3.00 |
| Total | 100.00 | 100.00 | 100.00 |
| Notched Izod [ft-lb./in.] | 11.6 | 2.6 | 2.2 |
| Dynatup @ 22° C. Max Load [ft.-lb.] | 35.4 | 29.4 | 39.0 |
| Dynatup @ 22° C. Total Energy [ft.-lb.] | 42.8 | 36.0 | 42.5 |
| Tensile Strength @ Yield [kpsi] | 9.06 | 8.89 | 8.84 |
| Tensile Strength @ Break [kpsi] | 7.53 | 6.67 | 6.48 |

-continued

|  | D | E | F | G |
|---|---|---|---|---|
| Flex. Strength [kpsi] |  | 14.6 | 14.3 | 14.2 |
| Flex. Modulus [kpsi] |  | 343.6 | 345.2 | 359.3 |

| | Example | | | |
|---|---|---|---|---|
| | D | E | F | G |
| Lexan ML4505-111 | 10.00 | 10.00 | 10.00 | 10.00 |
| Lexan ML8101-111N | 20.30 | 17.20 | 18.40 | 17.53 |
| PBT 315 | 30.00 | 30.00 | 30.00 | 30.00 |
| Lexan ML8121-111N | 14.00 | 14.00 | 14.00 | 14.00 |
| Lexan 4701R-110001 | 14.00 | 14.00 | 14.00 | 14.00 |
| 80:20 PC:Lotader AX8900 EMA-GMA conc. | 10.00 | 10.00 | 10.00 | 10.00 |
| Stabilizer Package | 1.30 | 1.30 | 1.30 | 1.30 |
| Color Package | 0.40 |  | 1.30 | 0.67 |
| 760-20-E, 54 μm Al pigment |  | 3.50 | 1.00 |  |
| 430-30-E1, 165 μm Al pigment |  |  |  | 2.50 |
| Total | 100.00 | 100.00 | 100.00 | 100.00 |
| Notched Izod [ft-lb./in.] | 15.8 | 2.0 | 2.0 | 3.6 |
| Dynatup @ 22° C. Max Load [ft.-lb.] | 55.8 | 37.0 | 38.3 | 28.3 |
| Dynatup @ 22° C. Total Energy [ft.-lb.] | 63.0 | 40.6 | 41.8 | 34.7 |
| Tensile Strength @ Yield [kpsi] | 9.14 | 8.76 | 8.93 | 8.76 |
| Tensile Strength @ Break [kpsi] | 8.18 | 6.64 | 6.64 | 6.60 |
| Flex. Strength [kpsi] | 14.4 | 14.0 | 13.9 | 13.5 |
| Flex. Modulus [kpsi] | 333.7 | 352.2 | 326.5 | 318.8 |

| | Example | | | | | |
|---|---|---|---|---|---|---|
| | H | 1 | 2 | 3 | 4 | 5 |
| Lexan ML4505-111 | 30.40 | 30.10 | 30.00 | 26.42 | 29.32 | 28.10 |
| Lexan ML8199-111N | 19.60 | 19.40 | 20.00 | 17.61 | 19.55 | 20.00 |
| PBT 315 | 39.00 | 38.61 | 38.00 | 33.47 | 37.14 | 38.00 |
| EXL-3691 MBS | 10.50 | 10.40 | 10.50 | 21.00 | 10.50 | 10.50 |
| Stabilizer Package | 0.50 | 0.50 | 0.50 | 0.50 | 0.50 | 0.40 |
| 760-20-E, 54 μm Al pigment |  | 1.00 | 1.00 | 1.00 |  |  |
| 880-20-E, 34 μm Al pigment |  |  |  |  | 3.00 | 3.00 |
| Total | 100.00 | 100.00 | 100.00 | 100.00 | 100.00 | 100.00 |
| Notched Izod [ft-lb./in.], Room Temp. | 15.5 | 10.3 | 10.6 | 11.0 | 9.2 | 9.8 |
| Dynatup @ 22° C. Max Load [ft.-lb.] | 41.6 | 38.7 | 39.4 | 35.7 | 39.3 | 45.3 |
| Dynatup @ 22° C. Total Energy [ft.-lb.] | 51.6 | 43.3 | 42.7 | 38.6 | 46.8 | 39.7 |
| Tensile Strength @ Yield [kpsi] | 7.36 | 7.28 | 7.18 | 5.91 | 7.22 | 6.83 |
| Tensile Strength @ Break [kpsi] | 7.35 | 7.45 | 7.32 | 6.58 | 6.69 | 6.99 |
| Flex. Strength [kpsi] | 11.56 | 11.46 | 11.51 | 9.42 | 11.55 | 10.77 |
| Flex. Modulus [kpsi] | 291.7 | 293.7 | 284.3 | 238.7 | 310.5 | 278.1 |

| | Example | | | | |
|---|---|---|---|---|---|
| | 2 | 3 | I | J | K |
| Lexan ML4505-111 powder | 30.00 | 26.42 | 30.17 | 26.76 | 31.88 |
| Lexan ML8199-111N pellets | 20.00 | 17.61 | 20.11 | 17.84 | 21.25 |
| PBT 315 | 38.00 | 33.47 | 38.22 | 33.90 | 40.38 |
| EXL-3691 MBS | 10.50 | 21.00 |  |  |  |
| 80:20 PC:Lotader AX8900 EMA-GMA conc. |  |  | 10.00 | 20.00 |  |
| Hytrel 4056 |  |  |  |  | 5.00 |
| Kraton G1651 S(EB)S rubber |  |  |  |  |  |
| Stabilizer Package | 0.50 | 0.50 | 0.50 | 0.50 | 0.50 |
| 760-20-E, 54 μm Al pigment | 1.00 | 1.00 | 1.00 | 1.00 | 1.00 |
| Total | 100.00 | 100.00 | 100.00 | 100.00 | 100.00 |
| Notched Izod [ft-lb./in.], Room Temp. | 10.6 | 11.0 | 3.1 | 11.1 | 1.4 |
| Dynatup @ 22° C. Max Load [ft.-lb.] | 39.4 | 35.7 | 43.9 | 41.1 | 39.9 |
| Dynatup @ 22° C. Total Energy [ft.-lb.] | 42.7 | 38.6 | 47.6 | 44.6 | 48.4 |
| Tensile Strength @ Yield [kpsi] | 7.18 | 5.91 | 8.49 | 8.01 | 9.32 |
| Tensile Strength @ Break [kpsi] | 7.32 | 6.58 | 5.96 | 7.04 | 6.85 |
| Flex. Strength (kpsi) | 11.51 | 9.42 | 14.04 | 13.18 | 15.34 |
| Flex. Modulus [kpsi] | 284.27 | 238.68 | 343.76 | 323.29 | 276.49 |

| | Example | | |
|---|---|---|---|
| | L | 6 | 7 |
| Lexan ML4505-111 powder | 30.17 | 31.19 | 28.47 |
| Lexan ML8199-111N pellets | 20.11 | 20.80 | 18.98 |
| PBT 315 | 38.22 | 39.51 | 36.06 |
| EXL-3691 MBS |  |  |  |
| 80:20 PC:Lotader AX8900 EMA-GMA conc. |  |  |  |
| Hytrel 4056 | 10.00 |  |  |
| Kraton G1651 S(EB)S rubber |  | 7.00 | 15.00 |
| Stabilizer Package | 0.50 | 0.50 | 0.50 |
| 760-20-E, 54 μm Al pigment | 1.00 | 1.00 | 1.00 |
| Total | 100.00 | 100.00 | 100.00 |
| Notched Izod [ft-lb./in.], Room Temp. | 1.4 | 16.1 | 15.9 |
| Dynatup @ 22° C. Max Load [ft.-lb.] | 37.8 | 39.7 | 36.5 |
| Dynatup @ 22° C. Total Energy [ft.-lb.] | 47.2 | 45.2 | 40.8 |
| Tensile Strength @ Yield [kpsi] | 9.02 | 7.62 | 5.92 |
| Tensile Strength @ Break [kpsi] | 6.48 | 7.35 | 6.39 |

-continued

| | | | |
|---|---|---|---|
| Flex. Strength (kpsi] | 15.01 | 12.72 | 9.93 |
| Flex. Modulus [kpsi] | 372.20 | 316.68 | 252.96 |

List of Ingredients
Lexan ML4505-11 - bisphenol A polycarbonate resin produced by General Electric Company
Lexan ML8199-111N - bisphenol A polycarbonate resin produce by General Electric Company
PBT 315 - poly(butylene terephthalate) available from General Electric Company under the designation VALOX ® 315 resin
80:20 PC:Lotader AX8900 - 80% polycarbonate/20% Lotadar ® AX8900 EMA-GMA impact modifier from Atochem
Stabilizer Package - includes Irganox 1076 from Ciba as oxidative stabilizer, zinc phosphate as a quencher
Color Package - standard colorants
EXL-3691 MBS - a methacrylate butadiene styrene impact modifier available from Rohm & Haas Co. under the designation Paraloid ® 3691
760-20-E, 54 μm Al flakes available from Silberline Mfg. Co.
880-20-E, 34 μm Al flakes available from Silberline Mfg. Co.
Hytrel ® 4056 modifier - a block copolyether ester available from DuPont
Kraton G1651 S(EB)S rubber - a styrene-ethylene/butylene-styrene tri-block copolymer from Shell Chemical
Notched Izod (Rm. Temp.) - The size of the test specimens were about 3" long by ½" wide by ⅛" thick and were tested in accordance with ASTM D256. Results are reported as the average of several samples.
Dynatup @ 22° C. Max Load & Dynatup @ 22° C. Total Energy - ASTM procedure D3763. In the Dynatup impact test, the energy absorbed by the sample by the falling dart is plotted on a graph from the time the dart first hits the sample until it punctures through the sample. E(max) is the maximum energy absorbed by the sample at the peak of the graph, which is a chart of the energy absorbed by the sample. E(tot) is the total energy absorbed over the range of time the dart first hist the sample until it punctures through the sample. Generally, E(max) and E(tot) are the average of several samples for each formulation tested, as shown in the tables.

Useful injection molded thermoplastic applications are those in which aesthetics, chemical resistance and/or impact strength are important. Examples include molded-in-color automotive components, outdoor vehicle and device ("OVAD") components, consumer goods, sporting goods such as backpack frames, toys, computer accessories, etc.

What is claimed is:

1. A polycarbonate/polyester resin molding composition which has enhanced impact resistance consisting essentially of
   a polycarbonate resin,
   a polyester resin,
   flakes having a desired coloration, and
   a core-shell impact modifier selected to enhance the impact strength of the molded resin, wherein a concentration of said flake is about 0.3–7 wt. % based on the total of said composition, and said modifier including a rubbery core comprising a polymer derived from butadiene or n-butyl acrylate and a shell comprising a polymer derived from methacrylate alone or in combination with styrene.

2. A polycarbonate/polyester resin molding composition according to claim 1 wherein said flakes comprise metal flakes or mineral flakes and said molding composition when tested according to ASTM D256 has a notched Izod of greater than about 6 ft.lbs./in.

3. A polycarbonate/polyester resin molding composition according to claim 1 wherein said impact modifier has a glass transition temperature below about minus 30 degrees Centigrade.

4. A polycarbonate/polyester resin molding composition consisting essentially of, based on the total weight of the composition,
   from 10 to 90 weight percent of a polyester resin;
   from 90 to 10 weight percent of an aromatic polycarbonate resin;
   from about 5 to about 25 percent by weight of a core-shell impact modifier having a rubber core of an acrylate based rubber or a butadiene based rubber and a shell grafted on the core wherein said shell comprises a polymeric material derived from a vinylaromatic compound, a vinylcyanide compound, or an alkyl methacrylate compound; and
   from about 0.3 to about 7 percent by weight of metal or mineral flakes for imparting a desired visual effect, said impact modifier enhancing the impact strength of molded composition as compared to a molding composition absent said impact modifier.

5. A polyester/polycarbonate molding composition according to claim 4 comprising less than 5 percent by weight additional ingredients.

6. A polyester/polycarbonate molding composition according to claim 5 wherein said additional ingredients comprise a suitable amount of quencher for deactivating metal catalyst residues and a suitable amount of a light stabilizer.

7. A polycarbonate/polyester resin molding composition according to claim 4 wherein said polyester is selected from the group consisting of poly(ethylene terephthalate) ("PET"), and poly(1,4-butylene terephthalate), ("PBT"), poly(ethylene naphthanoate) ("PEN"), poly(butylene naphthanoate), ("PBN"), (polypropylene terephthalate) ("PPT"), poly(cyclohexanedimethanol terephthalate) ("PCT"), and poly(1,4-cyclohexylenedimethylene 1,4-cyclohexanedicarboxylate) ("PCCD") and mixtures thereof.

8. A polycarbonate/polyester resin molding composition according to claim 4 wherein said polycarbonate comprises a branched aromatic polycarbonate.

9. A polycarbonate/polyester resin molding composition according to claim 4 wherein said flakes are aluminum.

10. A polycarbonate/polyester resin molding composition according to claim 4 wherein the flakes comprise from about 0.05 to about 5.0 weight percent of the resin composition.

11. A polycarbonate/polyester resin molding composition according to claim 10 wherein said flakes are metal and range in size from 17.5 microns to 650 microns.

12. A polycarbonate/polyester resin molding composition according to claim 10 wherein the flakes are metal and are selected from the group consisting of metals of Group I-B, III-A, IV, VI-B and VIII of the periodic table and physical mixtures and alloys of these metals.

13. A polycarbonate/polyester resin molding composition according to claim 10 wherein the flakes are mica.

14. A polycarbonate/polyester resin molding composition according to claim 10 wherein the flakes are metal and selected from the group consisting of aluminum, bronze, brass, chromium, copper, gold, iron, molybdenum, nickel, tin, titanium and zinc, alloys of these metals and physical mixtures thereof.

15. A polycarbonate/polyester resin molding composition according to claim 4 further comprising a background colorant having a different coloration than said flakes.

16. A polycarbonate/polyester resin molding composition according to claim 15 wherein said colorant is selected from the group consisting of carbon black, phthalocyanine blues, phthalocyanine greens, anthraquinone dyes, scarlet 3b Lake, azo compounds, acid azo pigments, quinacridones, chromophthalocyanine pyrrols, halogenated phthalocyanines, quinolines, heterocyclic dyes, perinone dyes, anthracenedione dyes, thioxanthene dyes, parazolone dyes and polymethine pigments.

17. A polycarbonate/polyester resin molded article having a background coloration and a visual special effect comprising a substrate consist essentially of from 10 to 90 weight percent of a polyester resin;

from 90 to 10 weight percent of an aromatic polycarbonate resin;

from about 5 to about 20 percent by weight of a core-shell impact modifier having a rubber core of an acrylate based rubber or a butadiene based rubber and a shell grafted on the core wherein said shell comprises a polymeric material derived from a vinylaromatic compound, a vinylcyanide compound, or an alkyl methacrylate compound; and from about 0.3 to about 7 percent by weight of metal or mineral flakes for imparting a desired visual effect, said impact modifier enhancing the impact strength of molded composition as compared to a molding composition absent said impact modifier.

18. A polycarbonate/polyester resin molded article according to claim 17 wherein said polyester is selected from the group consisting of poly(ethylene terephthalate) ("PET"), and poly(1,4-butylene terephthalate), ("PBT"), poly(ethylene naphthanoate) ("PEN"), poly(butylene naphthanoate), ("PBN"), (polypropylene terephthalate) ("PPT"), poly(cyclohexanedimethanol terephthalate) ("PCT"), and poly(1,4-cyclohexylenedimethylene 1,4-cyclohexanedicarboxylate) ("PCCD") and mixtures thereof.

19. A polycarbonate/polyester resin molded article according to claim 18 wherein said impact modifier has a core-shell structure with a rubbery core comprising a polymer derived from butadiene or n-butyl acrylate and a shell comprising a polymer derived from methacrylate alone or in combination with styrene.

20. A polyester/polycarbonate molded article according to claim 19 wherein including additional ingredients comprising a suitable amount of quencher for deactivating metal catalyst residues and optionally, suitable amount of a light stablizer.

21. A polycarbonate/polyester resin molded article according to claim 20 wherein said polycarbonate comprises a branched aromatic polycarbonate.

22. A polycarbonate/polyester resin molded article according to claim 21 wherein said flakes impart a pearlescent, metallic sparkle, metallic luster, or angular metamerism effect.

23. A polycarbonate/polyester resin molded article according to claim 22 wherein the flakes are based on mica.

24. A polycarbonate/polyester resin molded article according to claim 22 wherein the flakes are metal and selected from the group consisting of aluminum, bronze, brass, chromium, copper, gold, iron, silver, molybdenum, nickel, tin, titanium and zinc, alloys of these metals and physical mixtures thereof.

25. A polycarbonate/polyester resin molded article according to claim 22 wherein the flakes are aluminum.

26. A polycarbonatel polyester resin molded article according to claim 22 further comprising a background colorant having a different coloration than said flakes.

27. A polycarbonate/polyester resin molded article according to claim 26 wherein said colorant is selected from the group consisting of carbon black, titanium dioxide, phthalocyanine blues, phthalocyanine greens, anthraquinone dyes, scarlet 3b Lake, azo compounds, acid azo pigments, quinacridones, chromophthalocyanine pyrrols, halogenated phthalocyanines, quinolines, heterocyclic dyes, perinone dyes, anthracenedione dyes, thioxanthene dyes, parazolone dyes and polymethine pigments.

28. A polycarbonate/polyester resin molded article according to claim 26 wherein said molded article includes a clear weather resistant coating.

29. A polycarbonate/polyester resin molded article according to claim 28 wherein said coating comprises at least one coating layer comprising a polyester, polyurethane, or acrylic composition.

30. A polycarbonate/polyester resin molding composition consisting essentially of, based on the total weight of the composition, from 10 to 90 weight percent of a polyester resin;

from 90 to 10 weight percent of an aromatic polycarbonate resin;

from about 5 to about 25 percent by weight of a core-shell impact modifier having a rubbery core comprising a polymer derived from butadiene or n-butyl acrylate and a shell comprising a polymer derived from methacrylate alone or in combination with styrene; and from about 0.3 to about 7 percent by weight of metal or mineral flakes for imparting a desired visual effect, said impact modifier enhancing the impact strength of molded composition as compared to a molding composition absent said impact modifier.

31. A polycarbonate/polyester resin molding composition according to claim 30 wherein said flakes comprise metal flakes or mineral flakes and said molding composition when tested according to ASTM D256 has a notched Izod of greater than about 6 ft.lbs./in.

32. A polycarbonate/polyester resin molding composition according to claim 30 wherein said impact modifier has a glass transition temperature below about minus 30 degrees Centigrade.

33. A polyester/polycarbonate molding composition according to claim 30 comprising less than 5 percent by weight additional ingredients.

34. A polyester/polycarbonate molding composition according to claim 33 wherein said additional ingredients comprise a suitable amount of quencher for deactivating metal catalyst residues and a suitable amount of a light stabilizer.

35. A polycarbonate/polyester resin molding composition according to claim 30 wherein said polyester is selected from the group consisting of poly(ethylene terephthalate) ("PET"), and poly(1,4-butylene terephthalate) ("PBT"), poly(ethylene naphthanoate) ("PEN"), poly(butylene naphthanoate), ("PBN"), (polypropylene terephthalate) ("PPT"), poly(cyclohexanedimethanol terephthalate) ("PCT"), and poly(1,4-cyclohexylenedimethylene 1,4-cyclohexanedicarboxylate) ("PCCD") and mixtures thereof.

36. A polycarbonate/polyester resin molding composition according to claim 30 wherein said polycarbonate comprises a branched aromatic polycarbonate.

37. A polycarbonate/polyester resin molding composition according to claim 30 wherein said flakes are aluminum.

38. A polycarbonate/polyester resin molding composition according to claim 30 wherein the flakes comprise from about 0.05 to about 5.0 weight percent of the resin composition.

39. A polycarbonate ;/polyester resin molding composition according to claim 38 wherein said flakes are metal and range in size from 17.5 microns to 650 microns.

40. A polycarbonate/polyester resin molding composition according to claim 38 wherein the flakes are metal and are selected from the group consisting of metals of Group I-B, III-A, IV, VI-B and VIII of the periodic table and physical mixtures and alloys of these metals.

41. A polycarbonate/polyester resin molding composition according to claim 38 wherein the flakes are mica.

42. A polycarbonate/polyester resin molding composition according to claim 38 wherein the flakes are metal and selected from the group consisting of aluminum, bronze, brass, chromium, copper, gold, iron, molybdenum, nickel, tin, titanium and zinc, alloys of these metals and physical mixtures thereof.

43. A polycarbonate/polyester resin molding composition according to claim 30 further comprising a background colorant having a different coloration than said flakes.

44. A polycarbonate/polyester resin molding composition according to claim 43 wherein said colorant is selected from the group consisting of caron black, phthalocyanine blues, phthalocyanine greens, anthraquinone dyes, scarlet 3b Lake, azo compounds, acid azo pigments, quinacridones, chromophthalocyanine pyrrols, halogenated phthalocyanines, quinolines, hetrocyclic dyes, perinone dyes, anthracenedione dyes, thioxanthene dyes, parazolone dyes and polymethine pigments.

* * * * *